(12) United States Patent
Nicholson

(10) Patent No.: US 6,429,647 B1
(45) Date of Patent: Aug. 6, 2002

(54) ANGULAR POSITION SENSOR AND METHOD OF MAKING

(75) Inventor: Warren Baxter Nicholson, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/528,353

(22) Filed: Mar. 17, 2000

(51) Int. Cl.[7] .............................. G01B 7/14; G01B 7/30
(52) U.S. Cl. ................................ 324/207.2; 324/207.25
(58) Field of Search .......................... 324/207.2, 207.21, 324/207.25, 173, 174; 384/448

(56) References Cited

U.S. PATENT DOCUMENTS

| | | | | |
|---|---|---|---|---|
| 3,194,990 A | * | 7/1965 | Kendall | 310/10 |
| 5,130,650 A | * | 7/1992 | Lemarquand | 324/207.22 |
| 5,424,635 A | * | 6/1995 | Robinson et al. | 324/168 |
| 5,444,369 A | * | 8/1995 | Luetzow | 324/207.2 |
| 5,861,745 A | * | 1/1999 | Herden | 324/207.2 |

FOREIGN PATENT DOCUMENTS

| | | |
|---|---|---|
| DE | 42 16 344 A1 | 11/1993 |
| DE | 44 05 910 A1 | 8/1995 |
| DE | 19857017 A1 | 6/1999 |
| DE | 19548996 C1 | 7/1999 |

* cited by examiner

Primary Examiner—Edward Lefkowitz
Assistant Examiner—Reena Aurora
(74) Attorney, Agent, or Firm—Margaret A. Dobrowitsky

(57) ABSTRACT

An assembly for rotably supporting a magnet, the assembly has an outer ring member with a bearing member rotably mounted within the outer ring member and the bearing member has an inner opening for receiving and engaging a magnet. The magnet has an inner opening and a shaft at one end engaged within the inner opening of the magnet and the other end of the shaft is coupled to a mechanism for providing a rotational force to the shaft. A Hall effect sensor is mounted to the outer ring member and the Hall effect sensor is receptive to the angular position of the magnet.

21 Claims, 2 Drawing Sheets

ANGULAR POSITION SENSOR AND METHOD OF MAKING

TECHNICAL FIELD

The present invention relates to Hall effect sensors. In particular, an apparatus for mounting a movable magnet for use in a Hall effect sensor is disclosed.

BACKGROUND OF THE INVENTION

Hall sensors pick up and convert the magnetic field intensity of a magnet into a useful electrical signal. For example, known quantities such as position, speed, orientation and temperature etc. of an object can be determined by the intensity of the magnetic field sensed by the Hall sensor.

As expected, numerous applications utilizing a Hall effect position sensor have been employed. One such application is a Hall angular position sensor which determines the angular position of an object. Here, a magnet is mounted for rotation about an axis and according to the rotational position of the magnet's North Pole with respect to the axis, indicates that position of an object.

However, a major problem encountered with Hall angular position sensors is accurately controlling the distance between the magnet and the Hall sensor during rotation. For example, as a change in distance between magnet and the Hall sensor occurs, the intensity of the magnetic field surrounding the sensor is changed. This results in the Hall sensor interpreting the change in the magnetic field intensity being measured as a change in the angular position of the magnet which, of course, relates to the angular position of an object. Accordingly, unwanted change in the positioning of the magnet with respect to the Hall sensor will result in undesired false readings.

Accordingly, there is a need for an improved means for mounting and controlling the position of a magnet in a Hall effect sensor.

SUMMARY OF THE INVENTION

In an exemplary embodiment, a plastic bearing is inserted into a steel ring and a magnet is fixedly secured within an inner opening of the bearing. The bearing and its mounting allows the magnet to rotate about an axis without any unwanted movement.

The above-described and other features and advantages of the present invention will be appreciated and understood by those skilled in the art from the following detailed description, drawings, and appended claims.

DESCRIPTION OF THE PREFERRED EMBODIMENT

Figure 2:
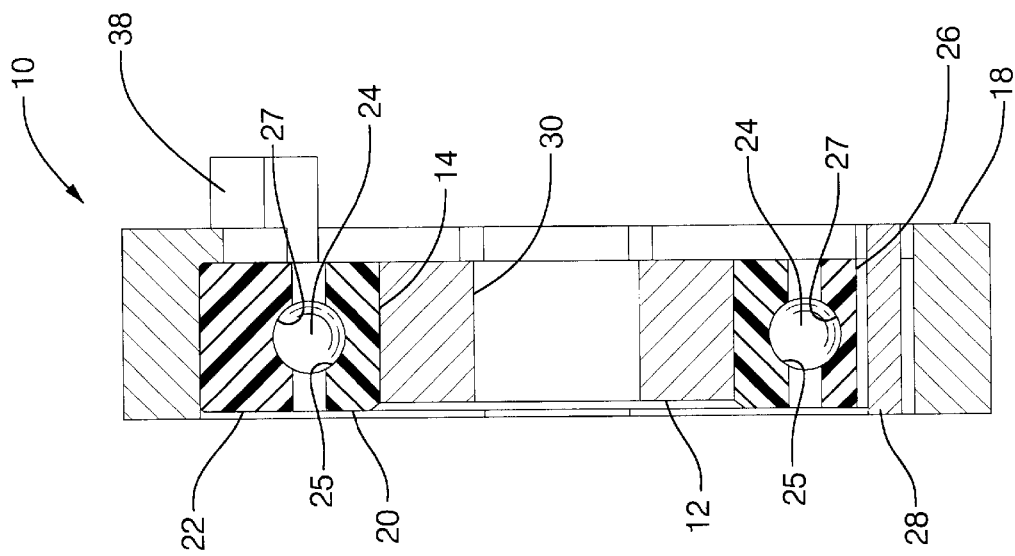
FIG. 2 is a view along the lines 2—2 of the FIG. 1 embodiment.
Figure 1:
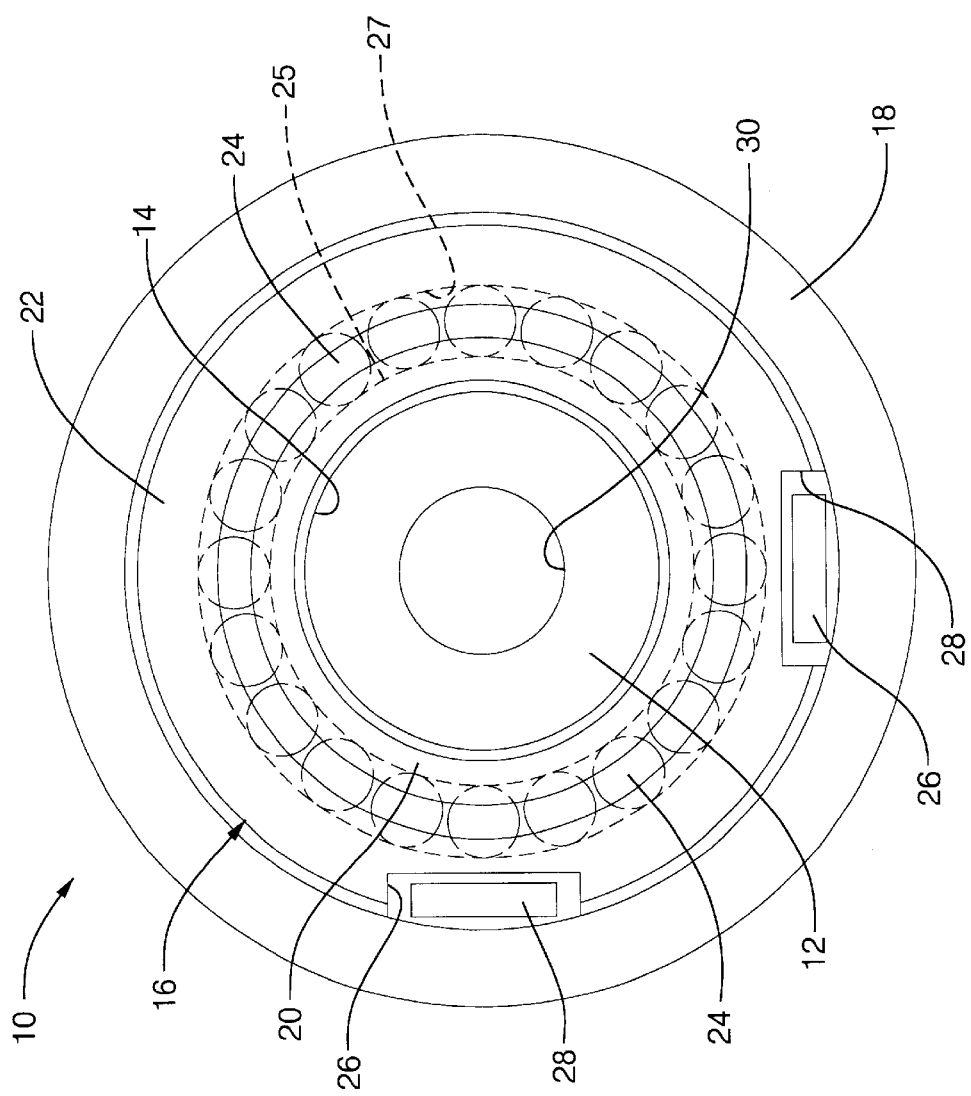
FIG. 1 is a top plan view of an apparatus for rotatably supporting a magnet for use in a Hall effect sensor system.
Figure 3:
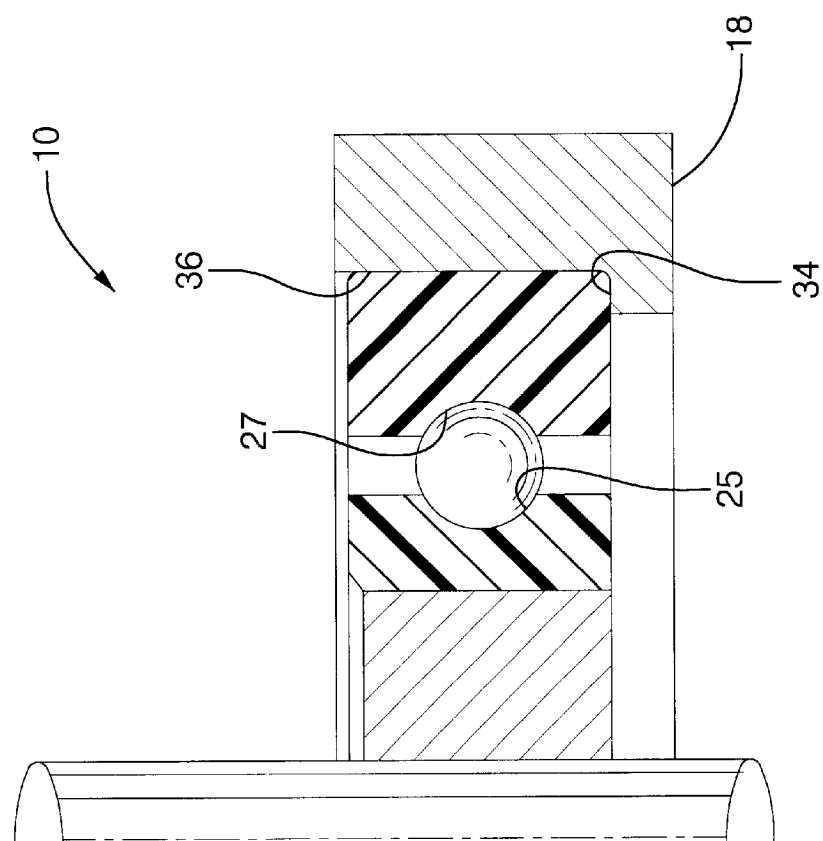
FIG. 3 is a cross-section of the view of the present invention.

Referring now to FIGS. 1–3, an assembly 10 for rotably supporting a magnet 12 is illustrated. Magnet 12 is received within an opening 14 of a bearing 16. The outer diameter of magnet 12 is slightly larger than the inside diameter of opening 14 in bearing 16. Accordingly, magnet 12 is press fitted within opening 14, and the press fitting of magnet 12 within opening 14 provides a rigid securement of magnet 12. Bearing 16 is received within a ring member 18. In an exemplary embodiment, bearing 16 is molded out of plastic. This allows bearing 16 to be magnetically transparent so as not to interfere with the magnetic field of magnet 12. In addition, and since bearing 16 is manufactured out of plastic, it is easily molded and relatively inexpensive to manufacture.

Bearing 16 has an inner ring member 20 and an outer ring member 22. A plurality of ball bearings 24 are located in between inner ring member 20 and outer ring member 22. Ball bearings 24 allow magnet 12 to rotate with respect to outer ring member 18 as well as outer ring member 22 of bearing 16. In an exemplary embodiment, bearings 24 are plastic. As an alternative, bearings 24 are stainless-steel. In either case, bearings 24 do not interfere with the intensity of the magnetic field generated by magnet 12. Inner ring member 20 is configured about its periphery to define a channel 25 to receive and retain the plurality of ball bearings positioned in between inner ring member 20 and outer ring member 22. In addition, the inner surface of outer ring member 22 is also configured to define a channel 27 to receive and retain the plurality of ball bearings. This configuration allows inner ring member 20 to rotate with respect to outer ring member 22.

The outer diameter of bearing 16 or outer ring member 22 is slightly larger than the inner diameter of outer ring member 18. Accordingly, bearing 16 is press fitted into outer ring member 18. This provides a snug fit of bearing 16 within outer ring member 18.

Bearing 16 is also configured to have a pair of notches 26 along the periphery of bearing 16. Notches 26 are located approximately 90 degrees from each other. Notches 26 are sufficiently large enough to accommodate a Hall sensor 28. In an exemplary embodiment, there are two notches and two Hall sensors. Of course, it is contemplated that apparatus 10 may employ a plurality of notches and sensors.

Magnet 12 has an inner opening 30. Accordingly, magnet 12 has a ring shape or can be referred to as a ring magnet. Inner opening 30 is configured to receive and engage a shaft 32. A shaft 32 is secured to magnet 12 at one end and a mechanical device such as a motor at the other. The outside diameter of shaft 32 is slightly larger than the inside diameter of opening 30. This provides for a rigid securement of shaft 32 to magnet 12. Accordingly, and as the mechanical device provides a rotational force to shaft 32, magnet 12 is also rotated.

A pair of Hall sensors 28 are located within notches 26. Accordingly, and as magnet 12 is rotated in a first direction, the North Pole of magnet 12 approaches one of the Hall sensors until a point of minimal distance is reached and then the North Pole of magnet 12 moves away from the sensor until a point of maximum distance is reached. The resulting variations of the distance of North Pole of magnet 12 with respect to sensor 28 causes a variation in the intensity of the magnetic field of magnet 12. This intensity is measured by sensor 28 and is converted into useful data such as the positioning of an object or the counting of a number of revolutions per minute. These applications may include, but are not limited to the following: steering the position; vehicle body height position; brake pedal position; and accelerator pedal position. Numerous other applications may be employed with such an arrangement.

Moreover, and since two sensors are positioned 90 degrees apart from each other, one of the Hall sensors will generate a Sine wave while the other will generate a Cosine wave as magnet 12 rotates. In an exemplary embodiment, magnet 12 has a single North and South Pole. As an alternative, and as applications may require, magnet 12 may be replaced by a plurality of magnets having the same overall configuration as magnet 12. However, the resulting magnets will provide a plurality of North and South Poles and accordingly, a plurality of magnetic fields.

Referring now in particular to FIG. 2, ring member 18 is configured to have a shoulder portion 34 which depends away from an inner surface 36 of ring member 18. Shoulder portion 34 provides a seat into which bearing 16 is received.

In an exemplary embodiment, inner opening 30 has a diameter of 3.0 mm. The outer diameter of magnet 12 is 11.0 mm. The outer diameter of bearing 16 is 21.0 mm and the height of bearing 16 is 4.0 mm. The outer diameter of ring member 18 is 25.0 mm and the height of ring member 18 is 5.0 mm. The thickness of shoulder portion is 0.5 mm. Of course, and as applications may require, it is contemplated that these measurements may be larger or greater than those indicated above.

A major problem encountered with Hall angular position sensors is accurately controlling the distance between the magnet and the Hall sensor during rotation. Any change in the distance between the magnet and the Hall sensor causes a change in the intensity of the magnetic field the Hall sensor is measuring. In this instance, this is interpreted incorrectly as a change in the angular position of the magnet.

There are two elements that can change the distance between the magnet and sensor. The first is an unwanted linear movement of the magnet and the second is an unwanted linear movement of the sensor. The unwanted movement of the sensor is corrected by normal good mounting practices. Yet, on the other hand, the movement of the magnet which is normally the rotating element is much more difficult to control. This is particularly true in high-volume, low cost applications. In order to prevent unwanted movement, the rotating magnet must have its axis shaft run very true or the runout and play will lead to large angular position errors.

The configuration of assembly 10 prevents unwanted movement of magnet 12 which may be misinterpreted by Hall sensors 28.

In an exemplary embodiment, the rotating magnet is placed in the center of the ball bearing assembly and Hall sensors are attached to the outer race of the bearing. The bearing is then pressed into the steel ring which acts as a flux concentrator. The steel ring assists in making the magnetic field between ring 18 to magnet 12 more uniform. This provides assembly 10 with a more accurate performance. The bearing is made of plastic and the balls are either stainless-steel or plastic which makes the entire ball bearing magnetically transparent. Typical run out and play for inexpensive injection molded plastic bearings with stainless-steel balls is 0.05 mm with a six Sigma distribution of the 0.0 to 0.1 mm.

Referring now to FIG. 2, outer ring member 18 has a tab portion 38 which protrudes outwardly from assembly 10. Tab portion 38 is received within an opening of a printed circuit board (not shown). Tab portion 38 can be secured to the circuit board by the use of an epoxy or other type of glue, or portion 38 can be soldered to the circuit board. Once assembly 10 is secured to the circuit board, the Hall effect sensors can be electrically coupled to the circuit board through soldering or other connection means.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An assembly for determining the angular position of an object, comprising:
   a) an outer ring member, defining an opening;
   b) a bearing having an outer ring and an inner ring, said outer ring being fixedly secured within said opening of said outer ring member and said inner ring being rotatably received within said outer ring, said inner ring having an inner opening;
   c) a magnet being fixedly received within said inner opening, said magnet being configured to receive a rotational force, said magnet rotating said inner ring when said rotation force is received; and
   d) a Hall effect sensor being mounted to said outer ring, said Hall effect sensor being receptive to the angular position of said magnet.

2. The assembly as in claim 1, wherein said bearing is plastic.

3. The assembly as in claim 2, wherein said bearing further includes a plurality of ball bearings positioned in between said inner ring and said outer ring.

4. The assembly as in claim 2, wherein the outside diameter of said bearing is slightly larger than the inside diameter of said outer ring member, and said bearing is press fitted into said outer ring member.

5. The assembly as in claim 4, wherein the outside diameter of said magnet is slightly larger than the inside diameter of said bearing, and said magnet is press fitted into said bearing.

6. The assembly as in claim 1, wherein said bearing is configured to have a pair of notches along the periphery of said outer ring.

7. The assembly as in claim 6, wherein a pair of Hall effect sensors are mounted in said pair of notches of said outer ring.

8. The assembly as in claim 1, wherein said outer ring member is configured to have a shoulder portion for receiving and supporting said bearing.

9. The assembly as in claim 1, wherein said outer ring member is stainless steel, wherein said outer ring assists in aligning the magnetic field of said magnet.

10. The assembly as in claim 1, wherein said magnet has an opening for receiving and supporting a shaft, said shaft being coupled to a mechanism which provides a rotational force to said shaft.

11. The assembly as in claim 1, wherein said inner opening of said bearing member is substantially circular.

12. The assembly as in claim 1, further comprising:
   a pair of receiving areas positioned along the periphery of said bearing, said receiving areas being configured and dimensioned to receive said Hall effect sensor and another Hall effect sensor.

13. The assembly as in claim 1, wherein said outer ring member has a tab portion, said tab portion being configured, dimensioned and positioned to secure said assembly to a printed circuit board.

14. The assembly as in claim 1, wherein said outer ring member, said bearing, said Hall effect sensor and said magnet are located substantially in the same plane.

15. An angular position sensor, comprising:

an outer ring member;

a bearing member having an outer ring portion fixedly secured within said outer ring member and an inner ring portion being rotatably received within said outer ring portion;

a magnet fixedly secured within said inner ring portion, said magnet having an inner opening configured for receiving and engaging a portion of a shaft; and a pair of sensors positioned to sense the angular rotation of said magnet, said pair of sensors being secured within a pair of receiving areas, said pair of receiving areas being located on said outer ring portion.

16. The angular position sensor as in claim 15, wherein said shaft is secured to a means for providing a rotational force.

17. The angular position sensor as in claim 15, wherein said outer ring member, said bearing, said magnet and said pair of sensors are substantially located in the same plane.

18. The angular position sensor as in claim 15, wherein said pair of sensors are positioned 90 degrees apart.

19. The angular position sensor as in claim 15, wherein said outer ring portion has a channel for receiving a plurality of bearings, said inner ring portion having a complementary channel for also receiving said plurality of bearings, said plurality of bearings facilitate the rotatable movement of said inner portion.

20. The angular position sensor as in claim 15, wherein linear movement of said bearing member with respect to said magnet is limited by the press fitting of said magnet into said inner ring portion.

21. An angular position sensor, comprising:

an outer ring member, having an inner opening;

a bearing member having a first portion fixedly secured within said inner opening of said outer ring member and a second portion rotatably received within said first ring portion;

a magnet fixedly secured within said second ring portion, said magnet being configured to have an inner opening for receiving a portion of a rotatable shaft; and a pair of sensors positioned to sense the angular rotation of said magnet, said pair of sensors being secured within a pair of receiving areas located in said first portion.

* * * * *